(12) United States Patent
Gretz (10) Patent No.: US 9,466,962 B1
(45) Date of Patent: Oct. 11, 2016

(54) RAIN TIGHT ELECTRICAL BOX ASSEMBLY FOR MOUNTING OF AN ELECTRICAL FAN OR FIXTURE

(71) Applicant: Arlington Industries, Inc., Scranton, PA (US)

(72) Inventor: Thomas J. Gretz, Port St. Lucie, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 0 days.

(21) Appl. No.: 14/789,069

(22) Filed: Jul. 1, 2015

Related U.S. Application Data (60) Provisional application No. 62/019,461, filed on Jul. 1, 2014.

(51) Int. Cl.
*H02G 3/08* (2006.01)
*H02G 7/00* (2006.01)

(52) U.S. Cl.
CPC .............. *H02G 3/088* (2013.01); *H02G 3/081* (2013.01); *H02G 3/083* (2013.01); *H02G 7/00* (2013.01)

(58) Field of Classification Search
CPC ........ H02G 3/088; H02G 3/081; H02G 3/08; H02G 7/00; H02G 3/10; H02G 3/123; H02G 3/125; H02G 3/20; F04D 25/088; H05K 5/00; H05K 5/02; H05K 5/0204
USPC ....................... 174/480, 481, 50, 53, 57, 58; 220/3.2–3.9, 4.02; 248/906, 343
See application file for complete search history.

(56) References Cited

U.S. PATENT DOCUMENTS

| | | | | |
|---|---|---|---|---|
| 5,522,577 A * | 6/1996 | Roesch | ................. | F04D 25/088 248/906 |
| 5,939,671 A * | 8/1999 | Gretz | ....................... | H02G 3/20 174/50 |
| 6,774,304 B1 * | 8/2004 | Gretz | ....................... | H02G 3/20 174/480 |
| 7,105,744 B1 * | 9/2006 | Kwong | .................... | H02G 3/20 174/50 |
| 7,148,420 B1 * | 12/2006 | Johnson | ................. | H02G 3/125 174/50 |
| 7,271,350 B2 * | 9/2007 | Johnson | .................. | H02G 3/20 174/480 |
| 8,076,575 B1 * | 12/2011 | Gretz | ..................... | H02G 3/123 174/481 |
| 8,148,634 B1 * | 4/2012 | Gretz | ..................... | H02G 3/123 174/481 |

* cited by examiner

*Primary Examiner* — Angel R Estrada (57) ABSTRACT

A rain tight fan or fixture box assembly for mounting a fan or and electrical fixture to a structural member. The rain tight electrical box assembly includes an electrical box and a medallion. The electrical box includes a sidewall and a back wall defining a wiring enclosure and tabs extending from the sidewall. The medallion includes a sidewall having a top edge and a bottom edge, and a flange extending outward from the bottom edge around the periphery of the sidewall. A plurality of bosses extending from the sidewalls of both the electrical box and medallion provide a means for aligning and securing the medallion to the electrical box. Complementary sealing surfaces on the electrical box and medallion enable a rain-tight fit that seals the fan or fixture box assembly in a rain-tight fit. The electrical box is capable of accepting direct mounting of a flood light thereto.

14 Claims, 11 Drawing Sheets

RAIN TIGHT ELECTRICAL BOX ASSEMBLY FOR MOUNTING OF AN ELECTRICAL FAN OR FIXTURE

This application claims the priority of Provisional U.S. Patent Application Ser. No. 62/019,461 filed Jul. 1, 2014.

FIELD OF THE INVENTION

This invention relates to mounting of outdoor electrical fans, and specifically to a rain tight electrical box assembly for mounting an outdoor fan to a support member.

BACKGROUND OF THE INVENTION

Electrical fans or fixtures are commonly mounted in locations that are exposed to wind-driven rain and water spray, such as pool screen enclosures, open porches, lanais, outdoor kitchens and eating areas, pavilions, greenhouses, barns and more. The fans or fixtures are typically mounted to a structural member with a conventional flangeless electrical box. Unfortunately, conventional outdoor electrical boxes do not provide adequate protection from wind-driven rain and water spray at the connection of the electrical fan or fixture to the box. Furthermore, there are typically no mounting holes provided for mounting to a structural member, and the installers drill holes in the electrical box wall to accommodate mounting screws. When the mounting screws are installed, the screws and screw threads are exposed to the box enclosure and the wiring therein, which could lead to electrical shorts.

Furthermore, the top mounting surface of the canopy portion of an outdoor fan typically is much wider than a conventional outdoor box, thereby creating a lot of open space between the electrical box and the outer edge of the canopy. This open area can allow water to build up in the canopy and thus lead to an electrical short or other unsafe condition.

Accordingly, it would be desirable to provide a fan or fixture box assembly that provides a rain tight seal between the structural member and the fan or fixture that prevents water intrusion and keeps wiring safe and dry inside the electrical box.

BRIEF SUMMARY OF THE INVENTION

The current invention is a rain tight fan or fixture box assembly for mounting a fan or electrical fixture to a structural member. The rain tight electrical box assembly includes an electrical box and a medallion. The electrical box includes a sidewall and a back wall defining a wiring enclosure therein. The medallion includes a sidewall having a top edge and a bottom edge, and a flange extending outward from the bottom edge around the periphery of the sidewall. Tabs extending from the sidewall of the electrical box include a top surface that is coextensive with the back wall. Pilot screws are driven through apertures in the tabs to provide initial connection of electrical box to the structural member. A plurality of bosses extending from the sidewalls of both the electrical box and medallion include bores therein. A first set of bosses are axially aligned to orient the medallion with respect to the electrical box and fasteners are driven there through to secure medallion to electrical box in a rain-tight fit. Load bearing fasteners are then driven through a second set of bosses to secure medallion to electrical box in a rain-tight fit. Connection of the medallion and the electrical box results in a rain tight box assembly that is capable of supporting a fan or fixture in a rain-tight assembly in which water stays out and wiring stays dry.

Objects and Advantages

A first object of the current invention is to provide a rain tight electrical box assembly that enables secure and rain-tight mounting of electrical fixtures or fans to a structural member.

A second object of the invention is to provide a labor saving solution to installing a fan or fixture exposed to the elements, inside or outside.

A further object of the invention is to provide a fan or fixture box that eliminates the need for time-consuming field modifications.

A further object of the invention is to provide a fan or fixture box that is completely sealed so that water stays out and the wiring stays dry.

A further object of the invention is to provide a fan or fixture box that is capable of supporting a 70 pound fan or fixture securely and safely.

A further object of the invention is to provide a fan or fixture box that is adapted for use with electrical cable or conduit.

DETAILED DESCRIPTION

Figure 1:
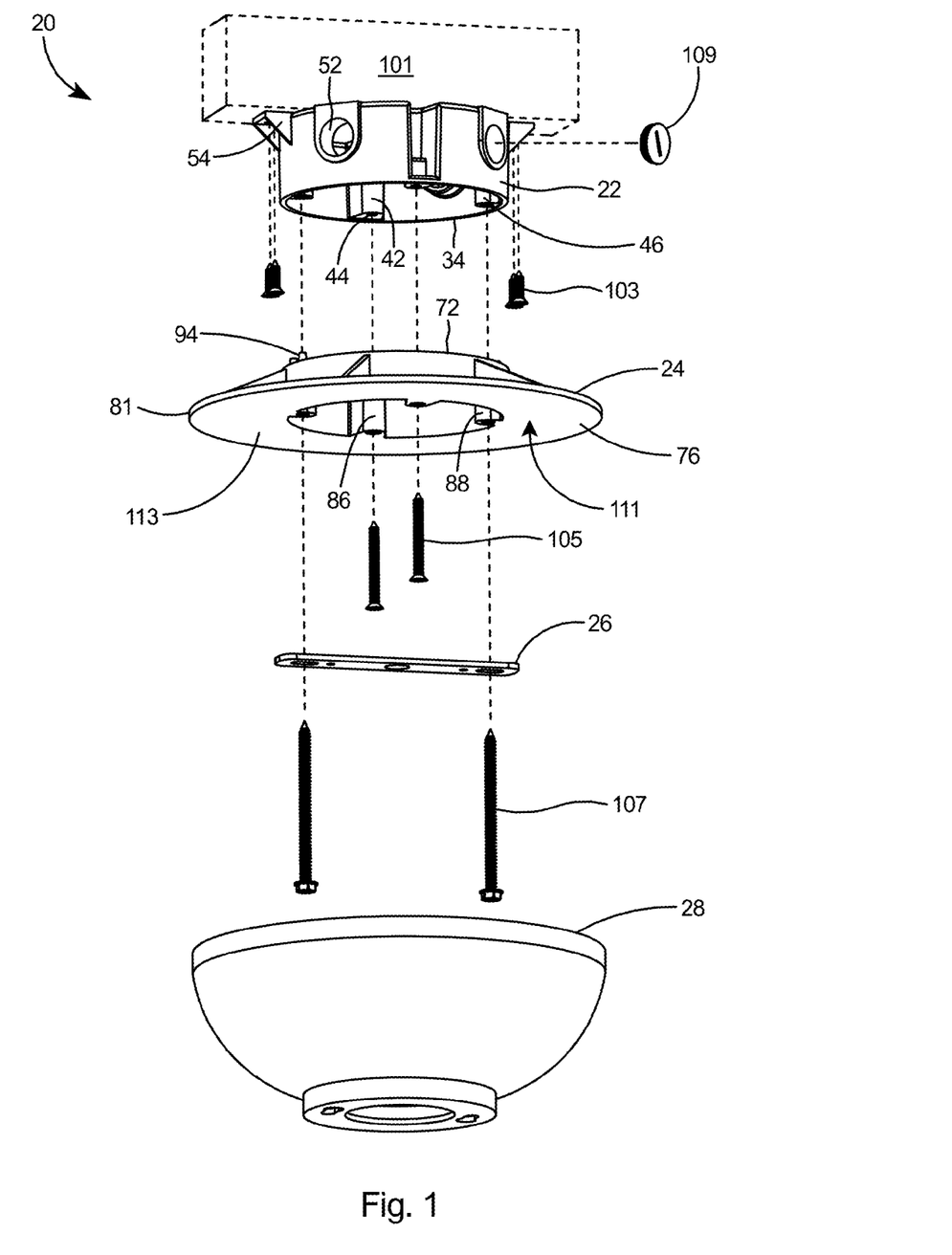
FIG. 1 is an exploded isometric view of the preferred embodiment of a rain tight electrical box assembly according to the present invention.

With reference to FIG. 1 there is shown the preferred embodiment of a rain tight electrical box assembly 20 according to the present invention. The rain tight electrical box assembly 20 includes an electrical box 22 and a medallion 24 that are used to mount a fan to a structural member. A fan bracket 26 and fan canopy 28, which are portions of an outdoor fan that are typically supplied by the fan manufacturer, are shown being secured to an overhead structural member by the rain tight electrical box assembly 20.

Figure 2:
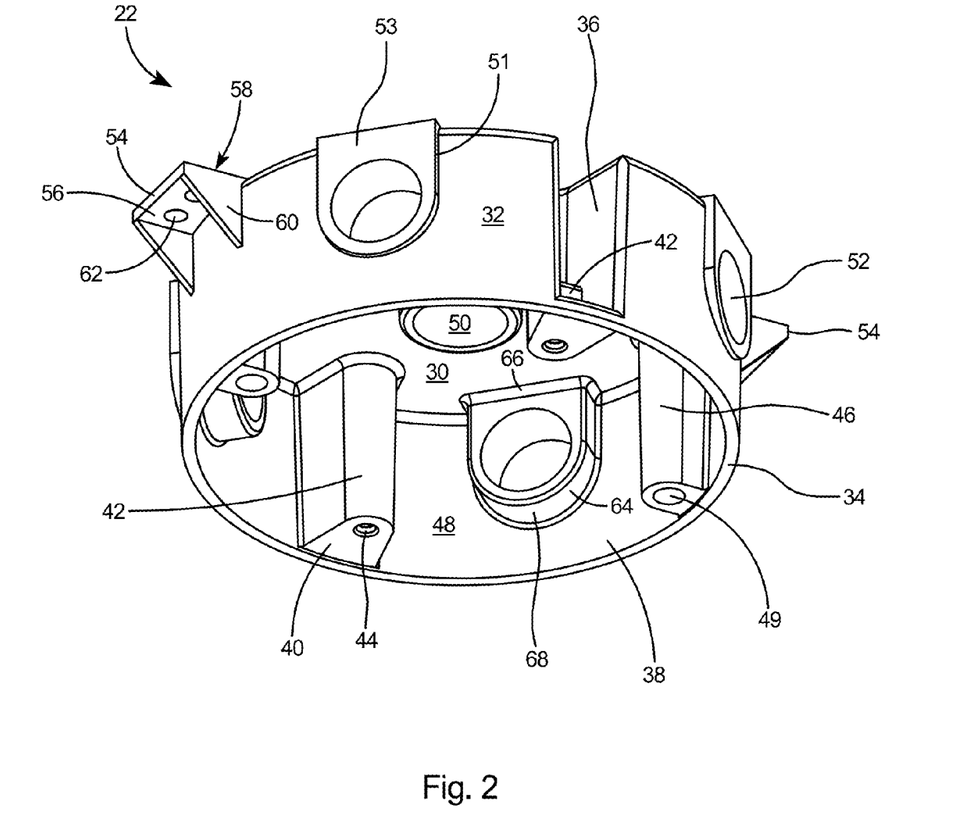
FIG. 2 is an isometric view of an electrical box that forms a portion of the rain tight electrical box assembly of FIG. 1.

Referring to FIG. 2, the electrical box 22 includes a back wall 30, a sidewall 32 having a planar bottom edge 34, and two inward extending sidewall portions or sidewall recesses 36 situated 180° across from one another on the sidewall 32. The back wall 30 and sidewall 32 define an electrical cavity or wiring enclosure 38 within the electrical box. The two sidewall recesses 36 each include a face portion 40 and a first boss 42 coextensive with the face portion 40. The first bosses 42 are recessed within the sidewall 32 and include a bore 44 therein.

The electrical box 22 further includes a pair of second bosses 46 situated 180° across from one another on the sidewall 32, with the second bosses 46 at 90° with respect to the first bosses 42 across the face of the open end of the electrical box 22. Second bosses 46 are solid members extending from the inner surface 48 of the electrical box sidewall 32 rather than an inward extension of the sidewall as for the first bosses 42. Second bosses 46 include bores 49 therein.

An electrical cable opening 50 is provided in the back wall 30 and a plurality of side openings 52 are provided in the sidewall 32. A hub 51 is provided surrounding each side opening 52 to provide a flat surface 53 for flush connection of the electrical conduit (not shown). The side openings 52 are each offset by 45° from the bosses 42 and 46 across the open end of the electrical box 22. Two tabs 54 extend outward from the sidewall 32 as shown. The tabs 54 are in alignment with the second bosses 46 of the electrical box. The tabs 54 include a base 56 having a top surface 58 that is flush with the back wall 30 of the electrical box 22 and two legs 60 extending between the base 56 and the sidewall 32. The base 56 includes one or more apertures 62 therein.

The side openings 52 include a peripheral wall 64 surrounding the opening and extending inward from the inner surface 48 of the sidewall 32. The peripheral wall 64 includes a flat edge 66 that is flush with the back wall 30 and an arcuate portion 68.

Figure 3:
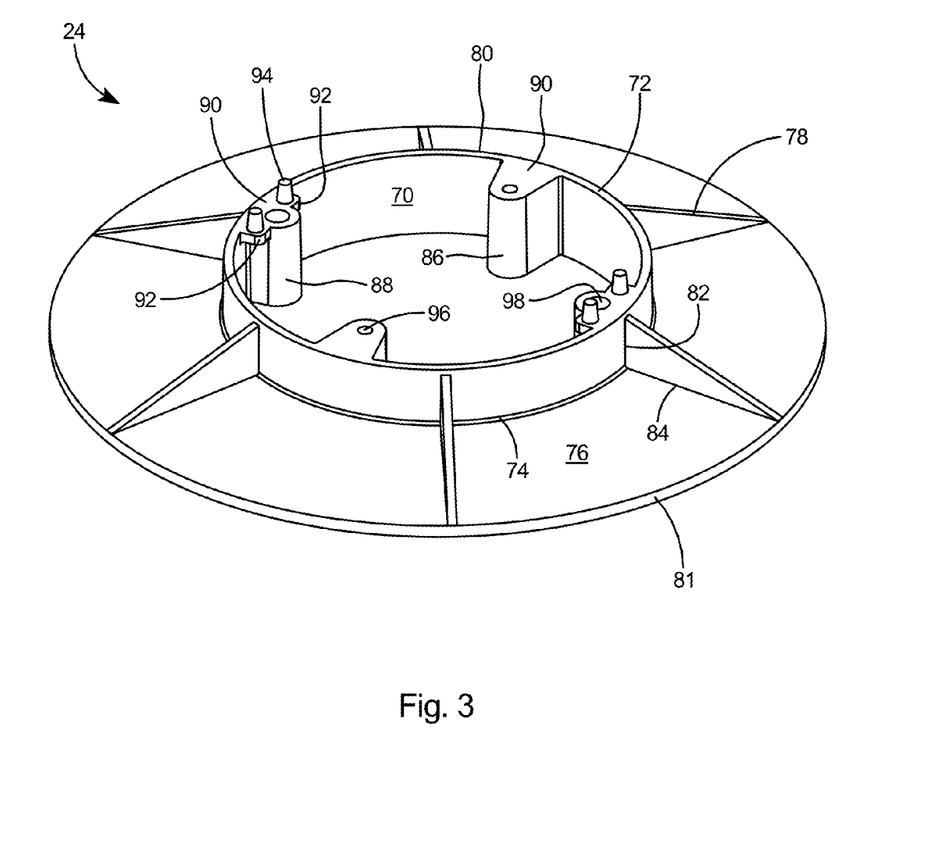
FIG. 3 is an isometric view of a medallion that forms a portion of the rain tight electrical box assembly of FIG. 1.

With reference to FIG. 3, medallion 24 includes a circular sidewall 70 with a planar top edge 72, a bottom edge 74, and a flange 76 extending outward around the entire periphery of the sidewall 70. A plurality of flange braces 78 extend radially from the outer periphery 80 of the sidewall 70. The flange braces 78 extend all the way from the sidewall 70 to the outer edge 81 of the flange 76. The braces 78 are substantially triangular-shaped with a flat base 82 in contact with the sidewall 70 and a long side 84 in contact with the flange 76.

Extending inward from sidewall 70 of medallion 24 are first bosses 86 and second bosses 88. Each of the bosses 86 and 88 include faces 90 that are flush with the top edge 72 of the canopy sidewall 70. Second bosses 88 include shoulders 92 and two alignment posts 94 extending from their faces 90. Alignment posts 94 are separated by a distance that will accommodate the outer dimension of the second bosses 46 (see FIG. 2) of electrical box 22. First bosses 86 include a bore 96 therein and second bosses 88 include a bore 98 therein.

Referring to FIG. 1, the rain tight electrical box assembly 20 is operated by initially securing the electrical box 22 to a structural member, such as a structural member 101, by driving pilot screws 103 through tabs 54 of electrical box 22. Electrical cable or conduit is secured to any of the openings 52 and wiring connections are completed within the box 22. Any unused openings 52 are sealed with blank plugs 109. Medallion 24 is then aligned with electrical box 22 by aligning posts 94 of medallion such that they straddle the outer sides of second bosses 46 of electrical box 22. Top edge 72 of medallion sidewall 70 is then pressed against bottom edge 34 of electrical box 22 and medallion 24 is secured to electrical box 22 by driving medallion fasteners 105 through first bosses 86 of medallion 24 into bores 44 of first bosses 42 in electrical box. Load bearing fasteners 107 are then driven through fan bracket 26, through second bosses 88 of medallion 24, through second bosses 46 of electrical box 22, and into structural member 101 in order to secure the rain tight electrical box assembly 20 to the structural member.

The fan canopy 28 can then be secured to fan bracket 26 in the conventional manner and the remainder of the fan assembly (not shown) then secured to the fan canopy.

One distinct advantage provided by the rain tight electrical box assembly 20 of the present invention is that all the electrical connections and mechanical connections between the various portions of the electrical box assembly are sealed tightly together and are rain tight. Electrical cable openings 50 (see FIG. 2) and 52 are preferably threaded and able to accept blank plugs 109 for closing any unused openings. A further advantage is that all fasteners used on the inner side of the electrical box assembly are protected all the way through the box assembly, including the medallion 24 and the electrical box 22, which protection prevents the threads of the fasteners from contacting any electrical conductors within the assembly.

Figure 4:
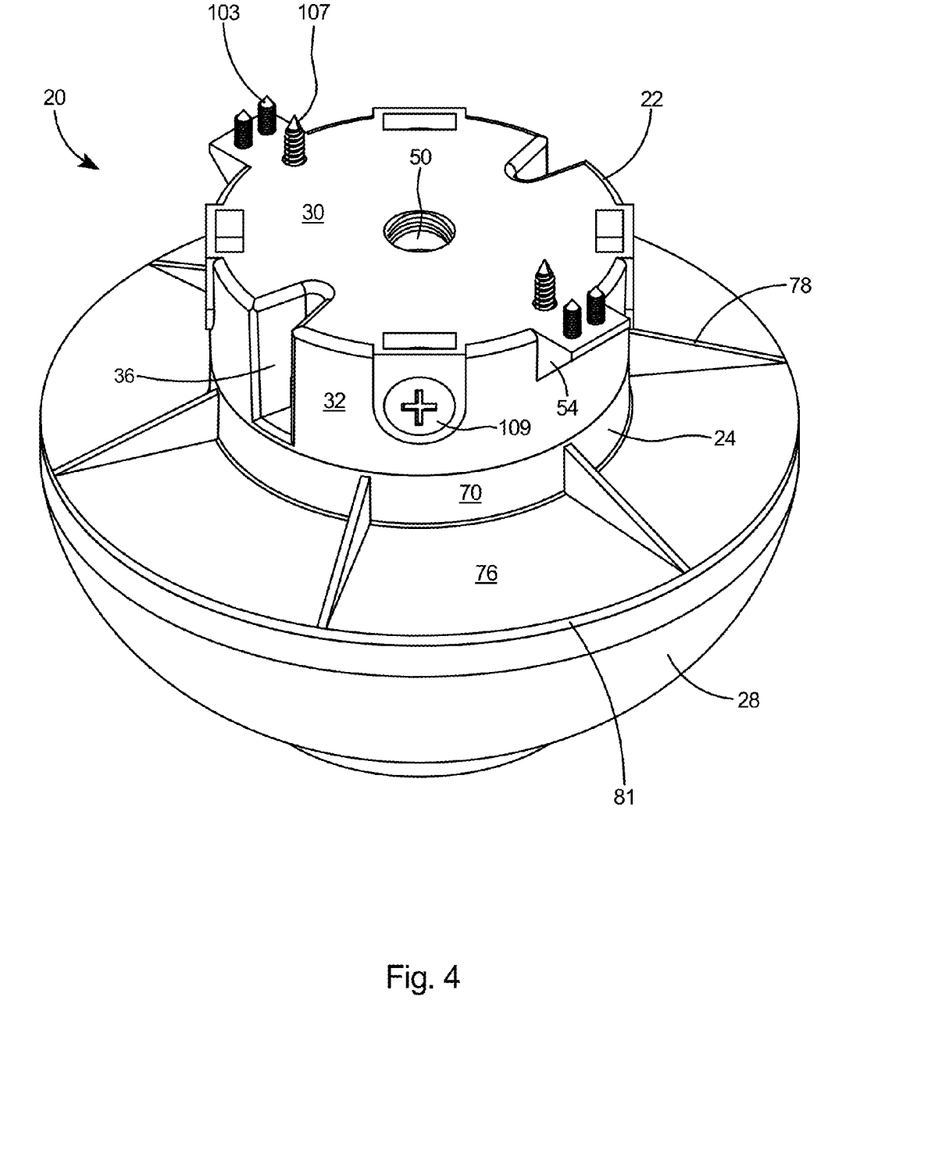
FIG. 4 is a top isometric view of the rain tight electrical box assembly with a fan canopy mounted thereto.

As shown in FIG. 4, when the rain tight electrical box assembly 20 is fully assembled, with electrical box 22, medallion 24, and fan canopy 28 secured together and to the structural member (not shown) and blank plugs 109 installed in any unused cable openings 50 and 52, any rain incident on the electrical box assembly 20 will run off the back wall 30 and sidewall 32 of the electrical box 22, off of the sidewall 70 of the medallion 24, and across and off of flange 76 and outer edge 81 of flange 76. Thus rain will be directed away from the electrical box assembly 20 and the fan suspended there below.

With reference to FIG. 1, preferably there are two first bosses 42 and 86 with bores 44 and 96 therein respectively forming a first set of bosses 42 including bores 44 therein on the electrical box 22 and on the medallion 24, the first set of the bores 44 and 96 capable of axial alignment and receipt of medallion fasteners 105 (see FIG. 1) for securing the medallion 24 to the electrical box 22. The rain tight electrical box assembly further includes a second set of bosses 46 and 88 including bores 49 and 98 therein on the electrical box 22 and on the medallion 24, the second set of the bores 49 and 98 capable of axial alignment and receipt of load bearing fasteners 107 (see FIG. 1) for securing the electrical box 22 to the structural member 101.

As shown in FIG. 1, most preferably the flange 76 of the medallion 24 has is substantially wider than the bottom edge 34 of the electrical box. Bottom side 111 of flange 76 includes a flat surface 113 that is substantially wider than the diameter of most conventional fan or fixture canopies 28 that carries all incident water to and over the outer edge 81 of the flange 76. The flat surface 113 enables a flush fit and rain-tight seal to be formed with virtually any size of canopy.

Figure 5:
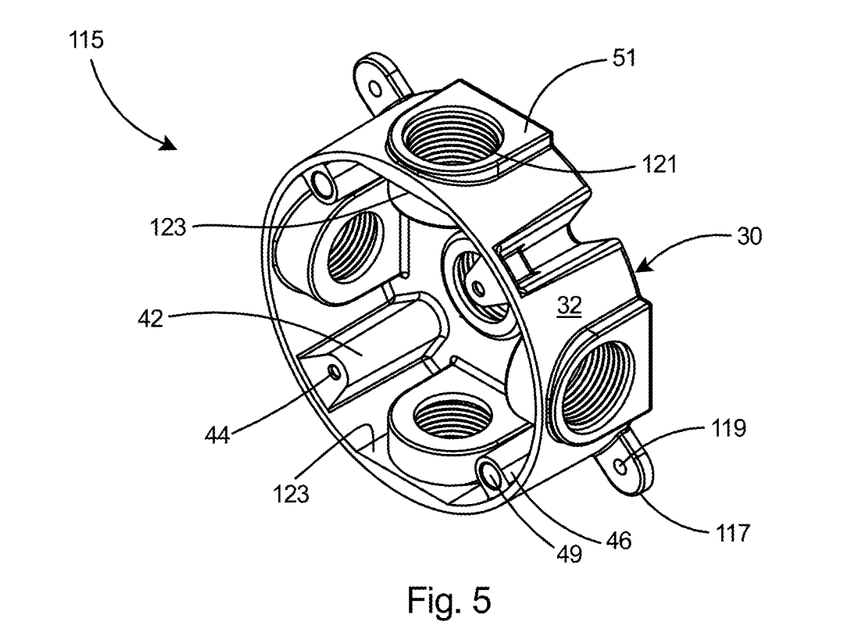
FIG. 5 is an isometric view of a second embodiment of an electrical box according to the present invention.
Figure 6:
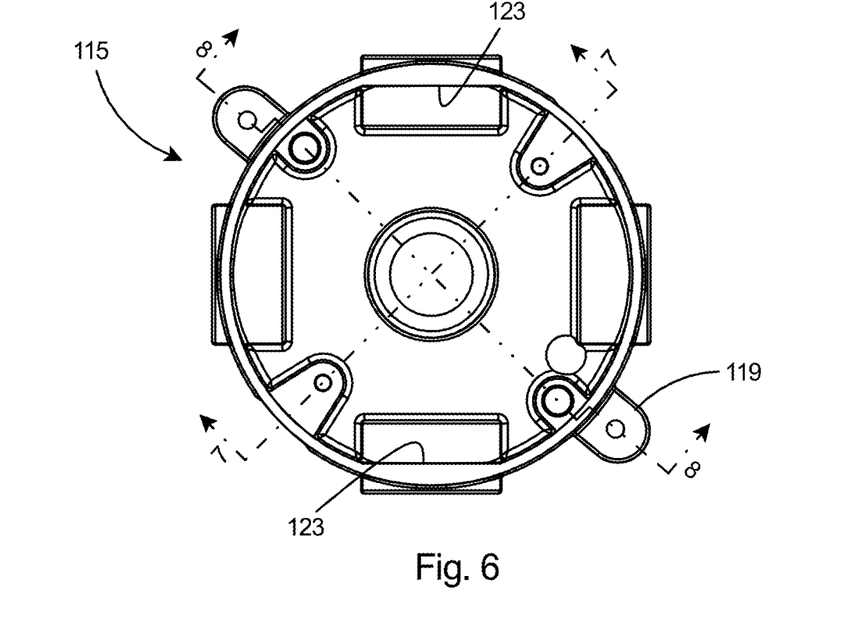
FIG. 6 is a plan view of the electrical box of FIG. 5 from the open end.

With reference to FIGS. 5 and 6, a second embodiment of the electrical box 115. The electrical box 115 includes first bosses 42 and second bosses 46 and planar tabs 117 extending from the sidewall of the box, with the top side of the tabs 117 substantially coplanar with the back wall 30 of the box. Tabs 117 include apertures 119 therein and the interior of hub 51 may include threads 121. The inner surface 48 of sidewall 32 may include one or more flat portions 123 as shown.

Figure 7:
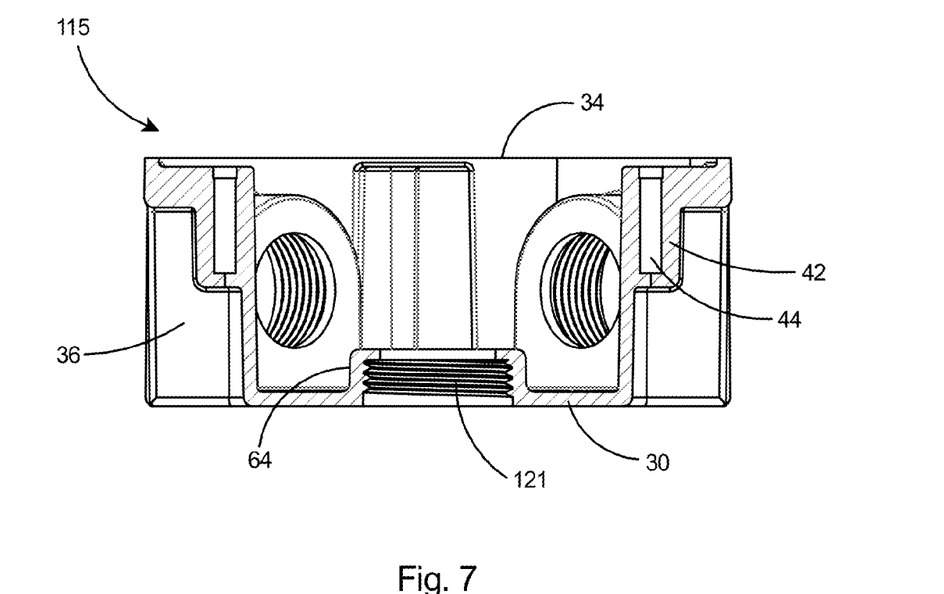
FIG. 7 is a sectional view of the electrical box taken along line 7-7 of FIG. 6.
Figure 8:
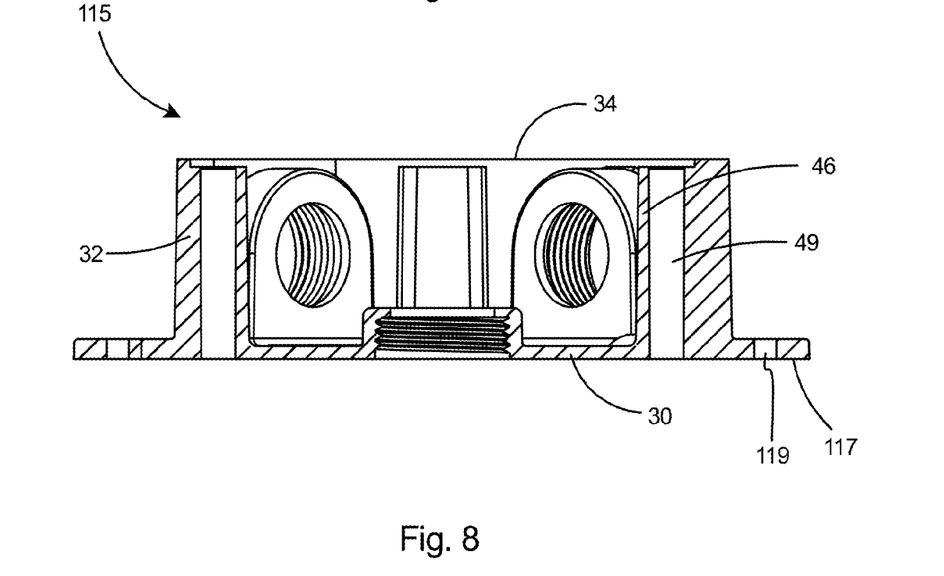
FIG. 8 is a sectional view of the electrical box taken along line 8-8 of FIG. 6.
Figure 9:
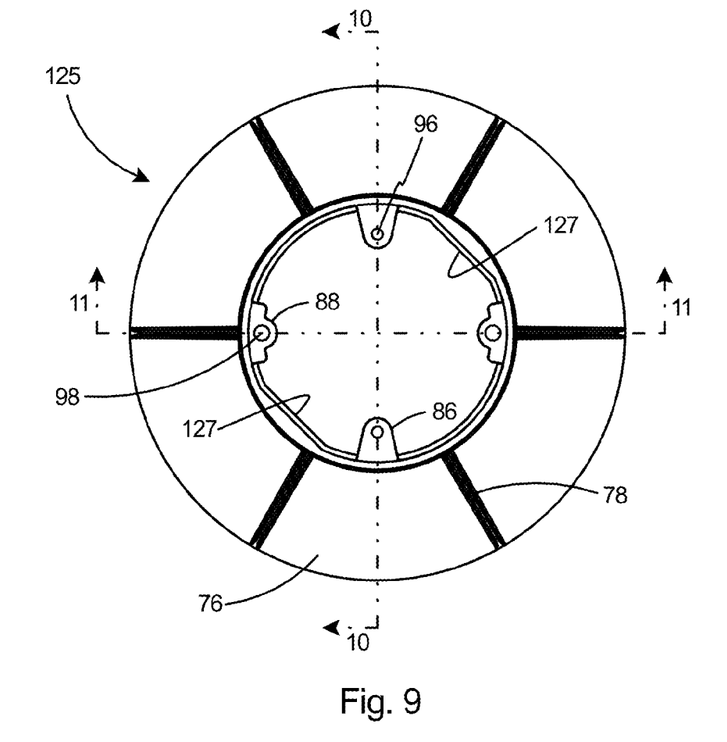
FIG. 9 is a top view of a second embodiment of a medallion according to the present invention.
Figure 10:
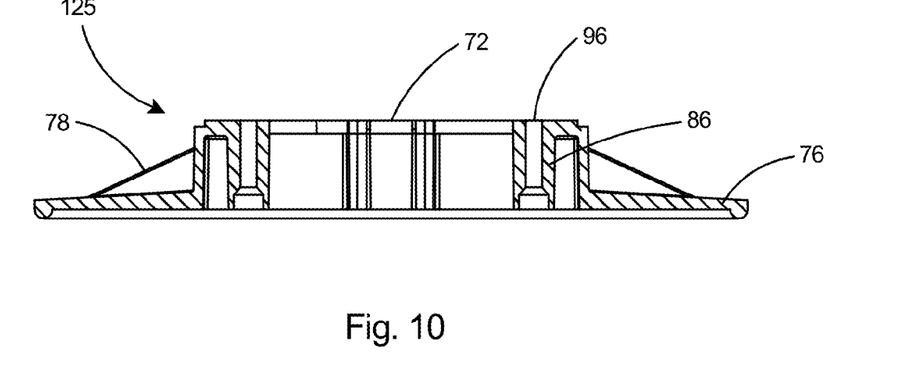
FIG. 10 is a sectional view of the medallion taken along line 10-10 of FIG. 9.
Figure 11:
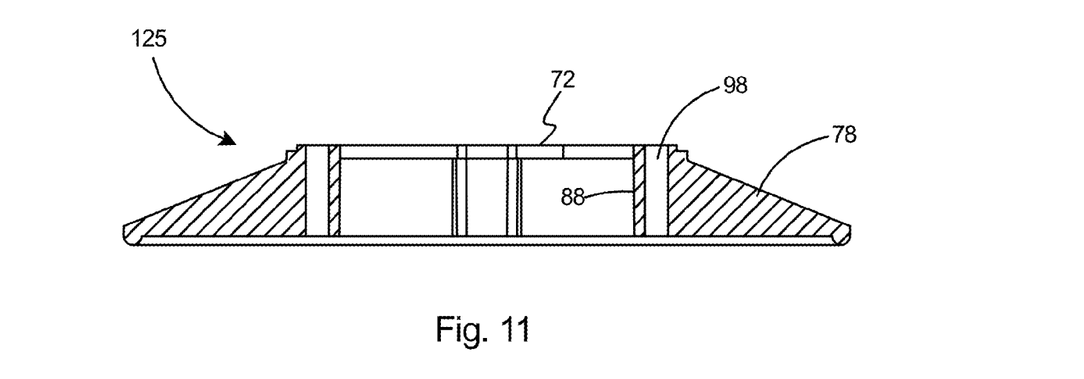
FIG. 11 is a sectional view of the medallion taken along line 11-11 of FIG. 9.

As shown in FIG. 7, electrical box 115 includes first bosses 42 with bores 44 therein and sidewall recesses 36 preferably positioned 180° across from one another on the sidewall 32. FIG. 8 depicts the arrangement of the second bosses 46 with their internal bores 49 and the tabs 117 having their top surface substantially coplanar with the back wall 30 of the electrical box 115.

With reference to FIGS. 9-11 and 14, a second embodiment of the medallion 125 may include one or more flat portions 127 on the inner surface 129 of the sidewall 70 as shown. The flat portions 127, in conjunction with flat portions 123 on electrical box (see FIG. 5) facilitate rapid alignment of medallion 125 to electrical box when assembling the portions together to form a rain tight electrical box assembly according to the present invention.

Figure 12:
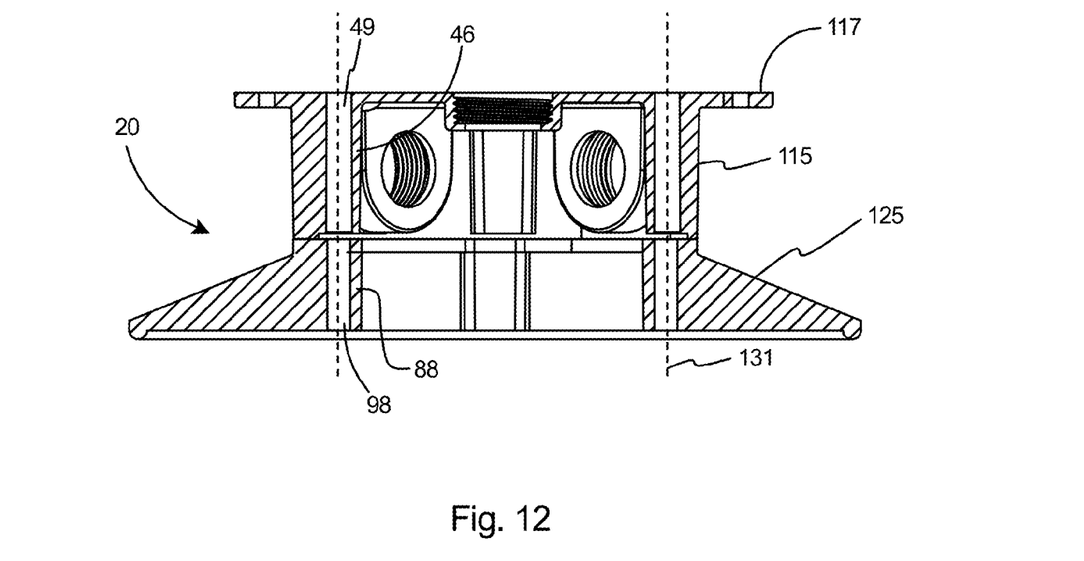
FIG. 12 is a sectional view of the rain tight electrical box assembly depicting the second bosses in alignment for receipt of load bearing fasteners.
Figure 13:
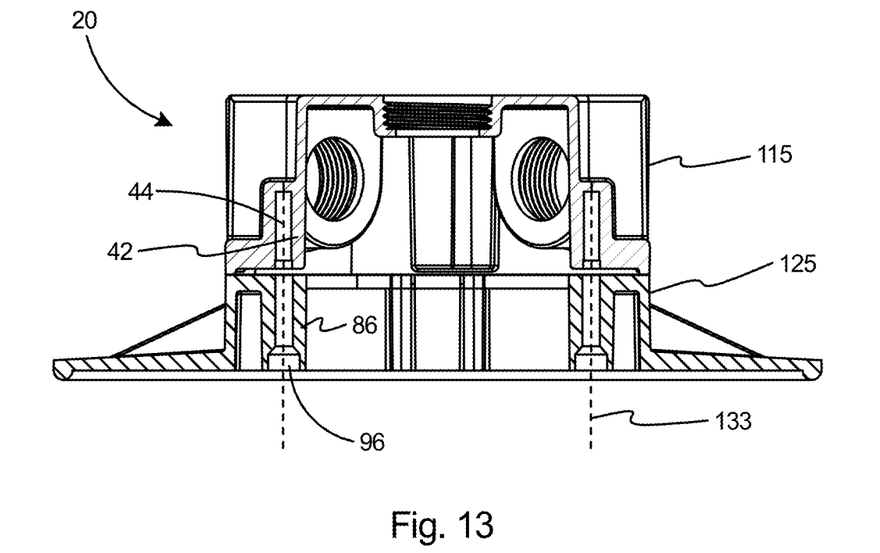
FIG. 13 is a sectional view of the rain tight electrical box assembly depicting the first bosses in alignment for receipt of medallion fasteners.
Figure 14:
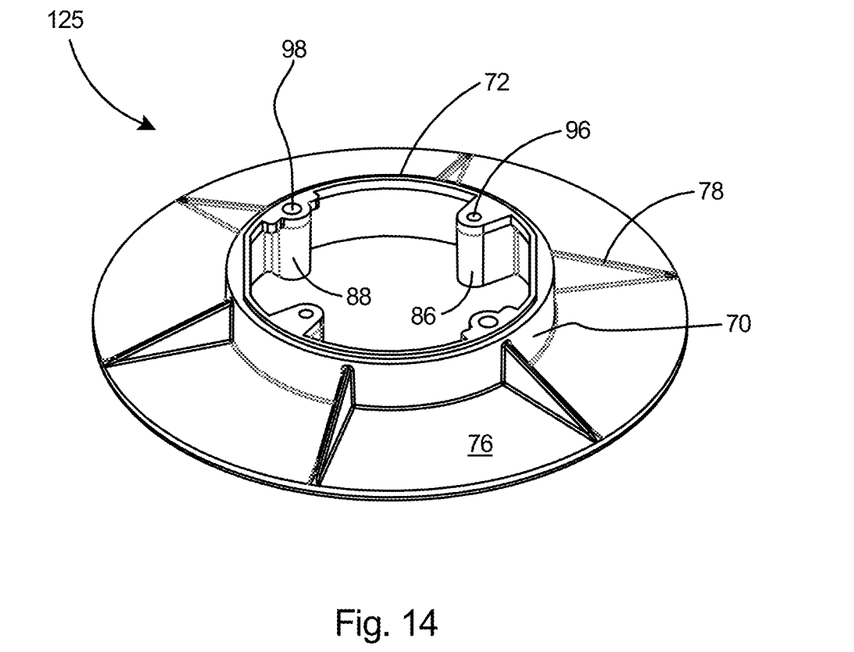
FIG. 14 is an isometric view of the second embodiment of the medallion.

Referring to FIGS. 12-13 electrical box 115 and medallion 125 may be rapidly assembled to form a rain tight electrical box assembly. As shown in FIG. 12, when assembled together, bores 98 in second bosses 88 of medallion 125 are in axial alignment with bores 49 in second bosses 46 of electrical box 115 and are ready for receipt of load bearing fasteners 107 (see FIG. 1) along axes 131. As shown in FIG. 13, when assembled together, bores 96 in first bosses 86 of medallion 125 are in axial alignment with bores 44 in first bosses 42 of electrical box 115 and are ready for receipt of medallion fasteners 105 (see FIG. 1) along axes 133. The bosses extend completely along the inner sidewalls of the electrical box and completely along the inner sidewalls of the medallion, thereby covering and protecting the fasteners secured therein. Thus all parts of the threaded fasteners and their threaded surfaces are protected from exposure to the internal wiring or conductors.

Although the electrical box and medallion can be constructed of metal or plastic, preferably, the front electrical box 22 and medallion 26 are each molded in one-piece of plastic. Most preferably, the plastic is polycarbonate or polyvinyl chloride (PVC).

Figure 15:
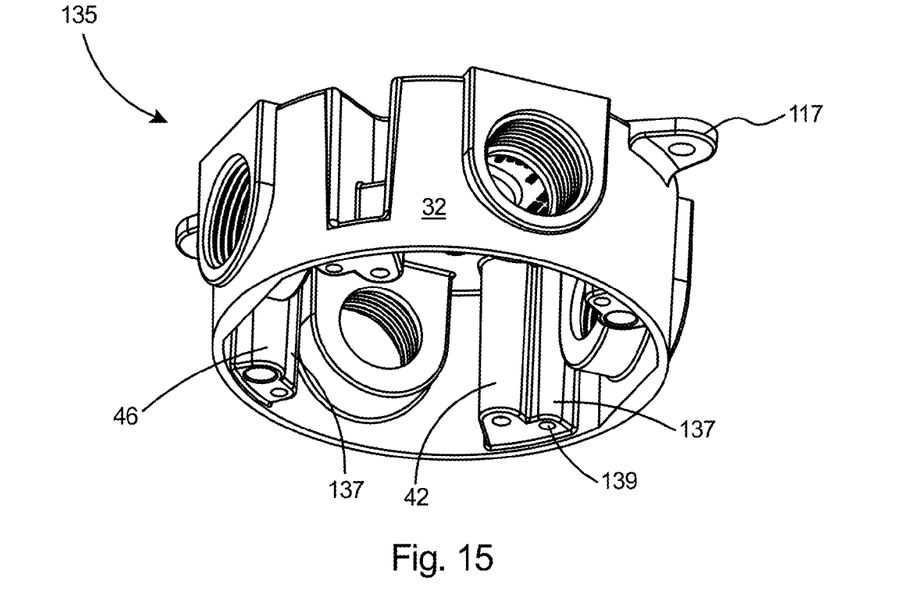
FIG. 15 is an isometric view of a third embodiment of an electrical box according to the present invention.
Figure 16:
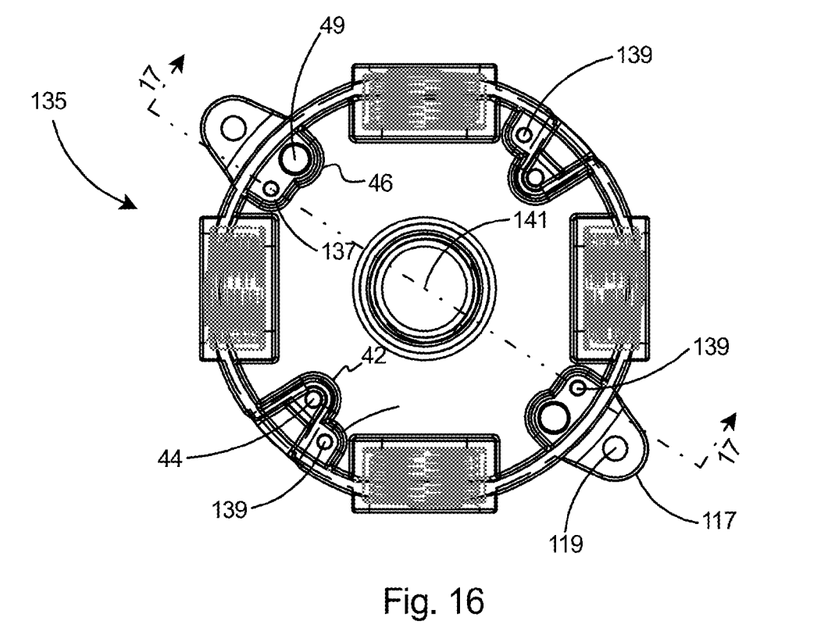
FIG. 16 is a bottom view of the electrical box of FIG. 15.
Figure 17:
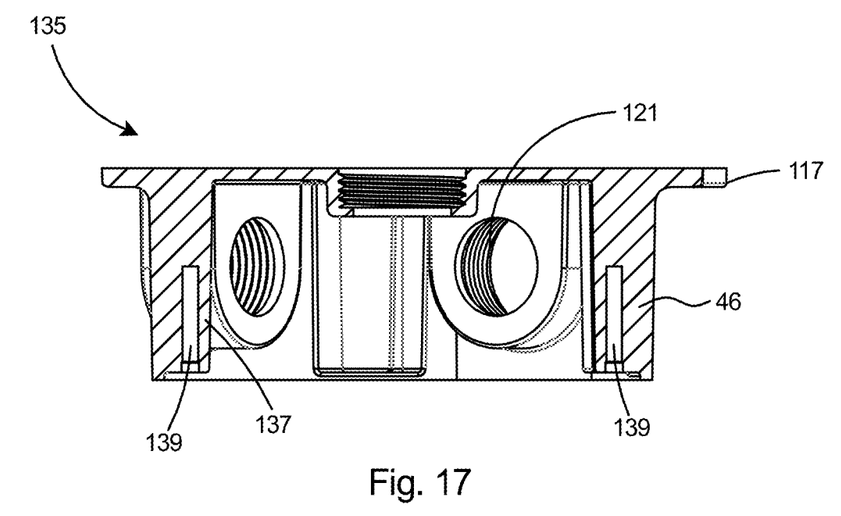
FIG. 17 is a sectional view of the electrical box taken along line 17-17 of FIG. 16.

With reference to FIGS. 15-17 a third embodiment of the electrical box 135 may be used in conjunction with a medallion for mounting of either an electrical fan or fixture (not shown) or may be used for direct mounting of a flood light (not shown). As shown in FIG. 15, the electrical box 135 includes a side boss 137 that is coextensive with each of the first bosses 42 and second bosses 46. Each of the side bosses 137 include a second bore 139 therein. As shown in FIG. 16, the second bores 139 are spaced at substantially 90° apart radially around the periphery of the electrical box sidewall 32. Second bores 139 are at a longer distance from the axial center 141 of the electrical box 32 than the bores 44 in first bosses 42 and the bores 49 in second bosses 46.

Figure 18:
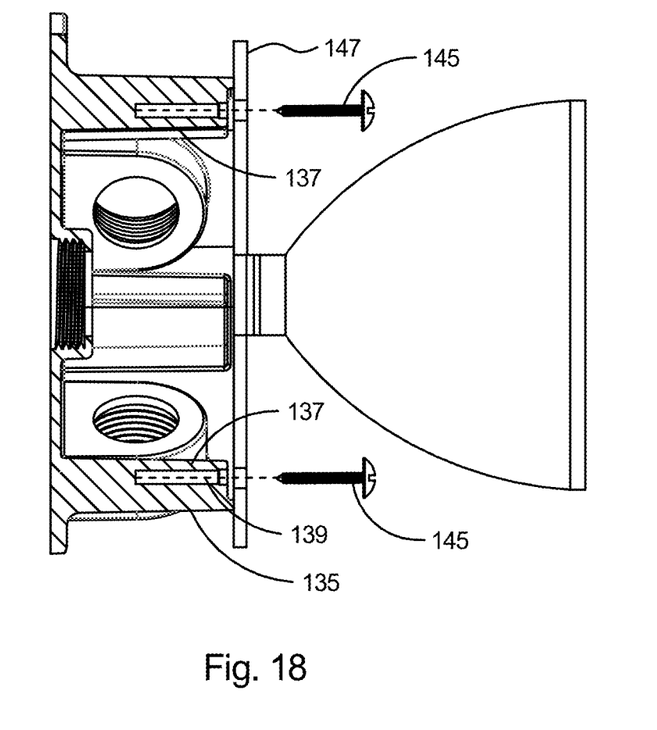
FIG. 18 is a sectional view of the electrical box taken along line 17-17 of FIG. 16 with a flood light in alignment to be assembled to the electrical box.

With reference to FIG. 18, electrical box 135 may be used for direct mounting of a flood light 143 thereto. In order to mount the flood light 143, fasteners 145 are driven through the base plate 147 of the flood light 143 and into the second bores 139. Thus the third embodiment of the electrical box 135 may be used for direct mounting of a flood light thereto, without the use of a medallion. Alternatively, electrical box 135 may be used with the various embodiments of the medallion as described herein, in order to mount an electrical fan or fixture to a structural member. The bosses 42 and 46 and side bosses 137 extend completely along the inner sidewall 32 of the electrical box 135, thereby covering and protecting the fasteners that will be secured therein. Thus all parts of the threaded fasteners and their threaded surfaces are protected from exposure to the internal wiring or conductors.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A rain-tight electrical box assembly for securing an electrical fan or fixture to a structural member, comprising:
   an electrical box including a sidewall having an inner surface and an outer surface and a back wall defining an electrical enclosure therein, and a planar bottom edge on said sidewall;
   a medallion including a sidewall having a top edge, a bottom edge, and a flange extending from said bottom edge;
   one or more tabs integral with and extending outward from said outer surface of said sidewall of said electrical box;
   fasteners for securing the electrical box to the structural member and the medallion to the electrical box;
   one or more first bosses on said electrical box, said first bosses of said electrical box including bores therein;
   one or more first bosses on said medallion, said first bosses of said medallion including bores therein, wherein said bores of said first bosses of said medallion are configured for axial alignment with said bores of said first bosses on said electrical box;
   a recessed sidewall portion at each of said first bosses on said electrical box;
   a face on said first boss of said medallion; and
   said face on said first boss of said medallion flush with said top edge of said sidewall of said medallion.

2. The electrical box assembly of claim 1, further comprising an aperture in each of said tabs of said electrical box.

3. The electrical box assembly of claim 1, further comprising:
   a planar bottom edge on said electrical box; and
   a planar top edge on said medallion, wherein said planar edges enable a flush and rain-tight connection of said medallion to said electrical box.

4. The electrical box assembly of claim 1, wherein said fasteners include
   a box fastener for securing the electrical box to the structural member; and
   a medallion fastener for securing said medallion to said electrical box.

5. The electrical box assembly of claim 1, further comprising a leg extending between said tab and said sidewall of said electrical box.

6. The electrical box assembly of claim 1, further comprising a top surface on said tab.

7. The electrical box assembly of claim 6, wherein said top surface of said tab is coextensive and flush with said back wall of said electrical box.

8. The electrical box assembly of claim 1, further comprising an opening in said sidewall of said electrical box.

9. The electrical box assembly of claim 8, further comprising:
- an inner surface on said sidewall of said electrical box; and
- a peripheral wall extending from said inner surface of said electrical box around said opening.

10. The electrical box assembly of claim 8, further comprising:
- an outer surface on said sidewall of said electrical box; and
- a flat raised surface extending from said outer surface of said electrical box around said opening.

11. The electrical box assembly of claim 1, further comprising one or more flange braces extending radially from said sidewall of said medallion.

12. The electrical box assembly of claim 1, further comprising a plug for closing said opening in said electrical box.

13. A rain-tight electrical box assembly for securing an electrical fan or fixture to a structural member, comprising:
- an electrical box including a sidewall having an inner surface and an outer surface and a back wall defining an electrical enclosure therein, and a planar bottom edge on said sidewall;
- a medallion including a sidewall having a top edge, a bottom edge, and a flange extending from said bottom edge;
- one or more tabs integral with and extending outward from said outer surface of said sidewall of said electrical box;
- fasteners for securing the electrical box to the structural member and the medallion to the electrical box;
- one or more second bosses on said electrical box;
- one or more second bosses on said medallion, wherein said second bosses of said medallion are configured for axial alignment with said second bosses on said electrical box;
- a shoulder on said second boss of said medallion;
- an alignment post extending from said shoulder;
- a face on said second boss of said medallion; and
- said face on said second boss of said medallion flush with said top edge of said sidewall of said medallion.

14. A rain-tight electrical box assembly for securing an electrical fan or fixture to a structural member, comprising:
- an electrical box including a sidewall having an inner surface and an outer surface and a back wall defining an electrical enclosure therein, and a planar bottom edge on said sidewall;
- a medallion including a sidewall having a top edge, a bottom edge, and a flange extending from said bottom edge;
- one or more tabs integral with and extending outward from said outer surface of said sidewall of said electrical box;
- fasteners for securing the electrical box to the structural member and the medallion to the electrical box
- a first set of bosses including bores therein on said electrical box and on said medallion, said first set of said bores capable of axial alignment and receipt of medallion fasteners for securing said medallion to said electrical box; and
- a second set of bosses including bores therein on said electrical box and on said medallion, said second set of said bores capable of axial alignment and receipt of load bearing fasteners for securing said electrical box to the structural member.

\* \* \* \* \*